> United States Patent Office 3,576,595
Patented Apr. 27, 1971

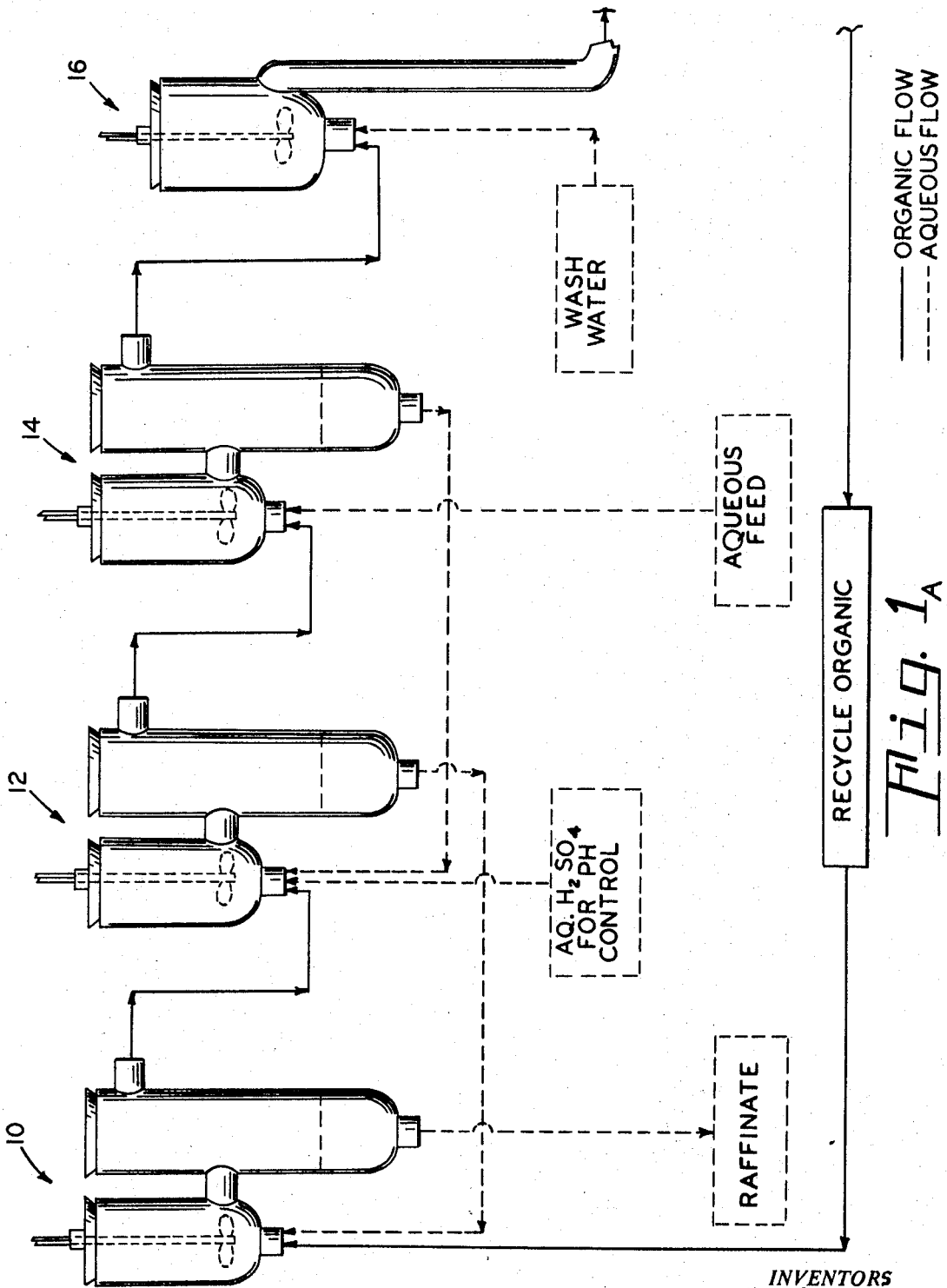

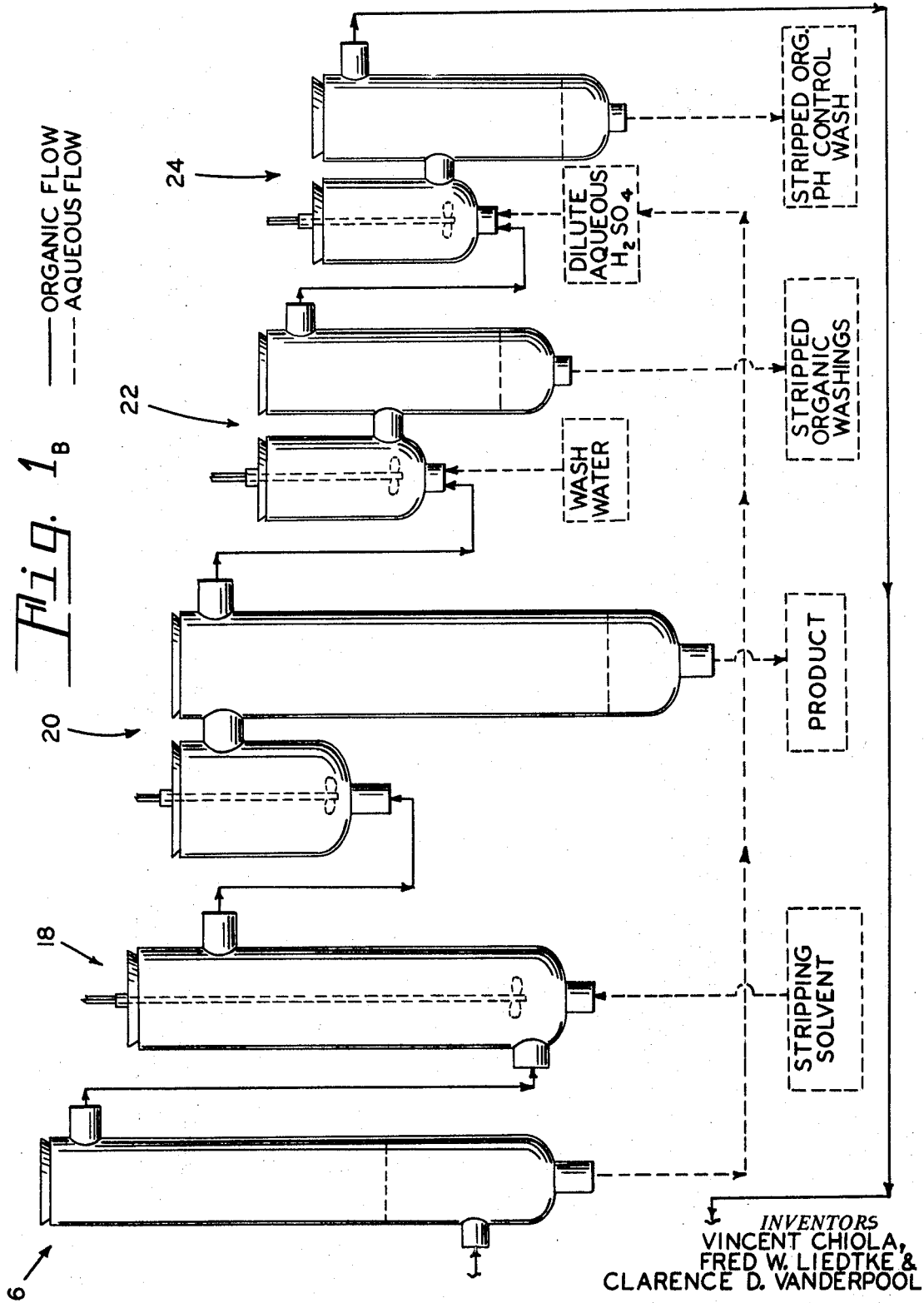

3,576,595
RECOVERY OF MOLYBDENUM VALUES FROM ALKALI MOLYBDATE SOLUTIONS
Vincent Chiola, Fred W. Liedtke, and Clarence D. Vanderpool, Towanda, Pa., assignors to Sylvania Electric Products Inc.
Filed June 30, 1969, Ser. No. 837,775
Int. Cl. C22b 59/00; C01g 39/00
U.S. Cl. 23—22                          9 Claims

ABSTRACT OF THE DISCLOSURE

A highly pure ammonium molybdate solution is obtained from an impure molybdenum source by a process that comprises digesting the molybdenum source in an aqueous solution of an alkali metal hydroxide, adjusting the pH of the resulting solution to from about 1 to about 4 to form an aqueous feed solution, contacting the aqueous feed solution with an organic extractant solution consisting essentially of a trialkyl amine, an alkyl phosphate ester and a water-insoluble hydrocarbon solvent to extract at least some of the molybdenum into the organic solution, separating the molybdenum-laden organic solution from the resulting molybdenum-barren raffinate, contacting the molybdenum-laden organic solution with an aqueous solution containing ammonium ions to remove at least some molybdenum from the organic solution and separating the organic solution and the aqueous solution containing ammonium and molybdenum.

BACKGROUND OF THE INVENTION

This invention relates to the recovery of molybdenum values from an aqueous alkali molybdate solution by solvent extraction or hydrometallurgical processing. More particularly, it relates to a liquid-liquid extraction process wherein molybdenum values are first extracted into an organic mixture and then recovered in the form of an aqueous ammonical molybdate solution. Furthermore, it relates to a method of recovering molybdenum in highly purified state as concentrated ammonium molybdate solution and subsequently as ammonium paramolybdate or molybdenum trioxide.

Ammonium molybdate solutions are conventionally obtained by digesting molybdenum trioxide in ammonium hydroxide and filtering to remove insoluble matter and/or impurities. Further processing via crystallization is used to obtain ammonium paramolybdate or an ammonium polymolybdate can be precipitated by acidification to a pH of about 3–4. In either procedure, a solid products is recovered by filtration or other means of solid-liquid separation.

One of the problems that arises when a high-purity end product, i.e. ammonium paramolybdate that can be processed eventually to metallurgical products such as wire, sheet, sintered products and the like, is that processing of technical grade molybdenum trioxide by the above-mentioned conventional process results in impurities such as silica, alkali and copper, that carry through to the final product. It is generally necessary to purify a high-purity commercial grade $MoO_3$ to approach required purity levels. Commercial-grade high-purity $MoO_3$, such as can be obtained by sublimation of technical grade $MoO_3$, can be used as starting material for purification through ammonium molybdate solution, ammonium paramolybdate, molybdenum oxide and finally to metal.

It is believed, therefore, that an efficient process that produces an ammonium molybdate solution having a high purity, thereby enabling metallurgical products to be obtained from the molybdate solution, from an impure raw material, is an advancement in the art. It is also believed that the process of this invention has an additional advantage in that it is capable of being conducted on a continuous basis. Additionally, concentrated solutions of feed and product can be processed by this invention.

SUMMARY OF THE INVENTION

In accordance wth one aspect of this invention there is provided a process wherein an impure molybdenum source material contaminated with certain impurities is dissolved in an aqueous alkali metal hydroxide solution, the pH of the resulting aqueous solution is adjusted from about 1 to about 4 to form an aqueous molybdenum-containing feed solution, the feed solution is contacted with an organic extractant solution consisting essentially of a trialkyl amine, a trialkyl phosphate and a water-insoluble hydrocarbon solvent to extract at least some of the molybdenum from the feed solution, the aqueous and organic solutions are separated and the molybdenum-laden organic solution is then contacted with an aqueous solution containing ammonium ions to remove at least some of the molybdenum from the organic solution and thereafter the aqueous solution that contains a highly purified molybdenum source is recovered.

BRIEF DESCRIPTION OF THE DRAWING

FIGS. 1A and 1B are a flow sheet of a continuous process utilized in the practice of the invention. FIG. 1A is the extraction circuit and FIG. 1B is the stripping circuit.

For a better understanding of the present invention, together with other and further objects, advantages and capabilities thereof, reference is made to the following disclosure and appended claims in connection with the above-described drawing and the above description of one of the aspects of the invention.

DESCRIPTION OF THE PREFERRED EMBODIMENTS

Any alkali metal hydroxide such as sodium and potassium hydroxide can be used to dissolve the impure molybdenum source material that contains impurities such as copper, alkali metals, sulfides and mixtures thereof. Sodium hydroxide is generally preferred because of cost and ready availability. In most instances the aqueous solution containing the alkali metal hydroxide and the impure molybdenum will have a pH of above about 7.5. The temperature of the solution generally is about 80–90° C. at the time essentially all of the impure molybdenum is dissolved. In most instances the solution thus formed will be filtered, diluted if necessary, to obtain a molybdenum concentration of from about 200 to about 300 grams/liter $MoO_3$ basis. The pH is thereafter adjusted from about 1 to about 4 and preferably to about 2 with a mineral acid such as sulfuric acid. A pH of from about 1 to about 4 is necessary from an operability standpoint. Lower and higher pH's of the feed solution can result in the formation of molybdenum ions that are not extractable under the conditions outlined herein.

The feed solution is contacted with an organic extractant solution consisting essentially of a trialkyl amines, tributyl phosphate and a water-insoluble hydrocarbon solvent. Examples of suitable trialkyl amines include tricaprylamine, tri-isooctylamine and tri-isodecylamine and the like. Preferably, the trialkyl amines such as Alamine 336 (General Mills) or Adogen 364 (Archer-Daniels-Midland, Inc.) are used. The solubilizers used are the di and tri alkyl phosphate esters such as tributyl phosphate, tripropyl phosphate, triamyl phosphate and the like. Although the dialkyl phosphate esters, wherein the alkyl radicals contain from 3 to 8 carbon atoms can be used, it is preferred to use the trialkyl phosphate esters wherein the alkyl radical contains from 3 to 8 carbon atoms. Typical examples of suitable trialkyl phosphates include tributyl phosphate, triamyl phosphate, tripropyl phosphate and the like. Of these, tributyl phosphate is the preferred solubilizer. The water-insoluble hydrocarbon solvent can be any of the petroleum distillate solvents such as kerosene, naphtha, benzene, toluene and the like, however, kerosene is preferred because of its cost, flash point and toxicity. By water-insoluble it is meant that less than 5 grams of the hydrocarbon will dissolve in 100 cc. of water at 25° C.

The components in the organic extractant solution can be used in various volumetric ratios within specified ranges. The volumetric ratio of extractant to solvent can be varied from about 1:1 to about 1:8 and the volumetric ratio of solubilizer to solvent can be varied from about 1:1 to about 1:17 and the volumetric ratio of solubilizer to extractant can be varied from about 1:5 to about 1:1.

The extraction of molybdenum from the feed solution into the organic phase occurs rapidly and at least some molybdenum is extracted almost instantaneously, however, for practical design reasons, it is preferred to use longer times so that the systems approach equilibirium. It has been found that from about 20 to 30 minutes of contact time between the organic extractant phase and the aqueous feed solution is preferred. Shorter periods of contact lower the efficiency and more stages are needed to achieve high efficiencies. Longer periods of contact do not improve the efficiency, therefore, lower the throughput of the system. The above contact times are based upon using conventional means of agitation that are generally used in chemical processes where liquid-liquid contact is desired.

The temperature during the extraction step can be varied up to about 45° C. Higher temperatures can result in degradation of the extractant solution. Temperatures of from about 20° C. to about 40° C. are preferred.

The volumetric ratio of extractant to the feed solution can be varied over a relatively wide range and achieve at least some of the benefits of this invention. As for example, the volumetric ratio of organic extractant solution to aqueous feed solution can be varied from about 100:1 to about 1:100 and at least some molybdenum will be extracted. In the instances where maximum concentration of molybdenum in the aqueous feed solution is desired, an organic extraction phase to the aqueous feed solution volumetric ratios of from about 4:1 to about 8:1 is preferred. Deviations from the preferred ratio can be tolerated but with a corresponding loss in efficiency as is apparent from the detailed example presented herein.

In the stripping step the molybdenum-laden organic solution is contacted with an aqueous strip solution that contains ammonium ions, to thereby recover the molybdenum. Efficient aqueous solutions contain a source of ammonium ions such as aqueous solutions of ammonium molybdate, ammonium hydroxide, ammonium chloride and the like. In general, any water-soluble ammonium compound, as well as ammonia, can be used to drive the ammonium ion source, however, a mixture of ammonium molybdate and ammonium hydroxide is preferred because of the efficiency, the number of stages required to achieve high recovery and the generation of a strip solution that can be converted directly into a high concentrated, useable product, ammonium molybdate.

The period of time required to remove the molybdenum from the organic phase is generally about the same as for the removal of molybdenum from the feed solution by the organic. Deviation from the preferred time results in either lower efficiency or decreased throughput as in the extraction step.

The volumetric ratio of strip solution to the molybdenum-pregnant organic phase can be varied from about 1:100 to about 100:1. A volumetric ratio of about 1:4 to about 4:1 is preferred from an efficiency and design standpoint.

To more fully illustrate this invention, the following detailed examples are presented.

EXAMPLE I

While in the specific example herein described in detail a continuous extraction process, the invention may also be carried out by batch extraction using the conventional mixer-settler systems. All parts, proportions, ratios and percentages are on a volumetric basis unless otherwise stated.

One system for carrying out continuous extraction illustrated shematically and depicts a series of mixer-settler units which can be divided into an extraction and a stripping circuit. With particular reference to FIG. 1A, the extraction circuit comprises of three stages, 1st stage 10, a 2nd stage 12, a 3rd stage 14 and a wash stage 16. with particular reference to FIG. 1B, the stripping circuit consists of stripping column or contactor 18, a mixer-settler 20, wash or scrub stage 22 and a final stage for regeneration of the organic 24.

In the extraction circuit FIG. 1A, aqueous sodium molybdate solution adjusted to a pH of about 2 with sulfuric acid and having a concentration of 145 g. $MoO_3$/l. is fed to the mixing compartment of the third stage 14. At the same time unloaded or barren organic is fed to the mixing section of the first stage 10 and flows countercurrently to the aqueous feed flow, that is, from stage 10 to 14 while extracting molybdenum at each stage.

The organic extractant used in this example is a mixture of (1) a tertiary amine, specifically, a commercially available tricaprylamine (e.g. Alamine 336 produced by General Mills, Inc., or Adogen 364 produced by Archer-Daniels-Midland, Inc.),
(2) a trialkyl phosphate specifically tri-n-butyl phosphate, and
(3) a liquid hydrocarbon diluent, more particularly kerosene having a relatively high flash point. The tertiary amine, trialkyl phosphate and liquid hydrocarbon are employed in a volume ratio of 1:1.2:7.8 respectively.

The aqueous feed solution, while traveling countercurrently to the organic in stages 10 to 12 to 14, becomes depleted of molybdenum values until discharged as raffinate containing less than 0.003 g. Mo/l. The pH is controlled at from about 1-3 during extraction by feeding sulfuric acid solution having a concentration of, for example, 150 grams of 98% $H_2SO_4$ per liter of water into the mixing compartment of stage 12 at a feed rate of 2 ml./min.

The loaded organic extractant from stage 14 travels to the wash stage 16 for reduction in entrained water-soluble impurities, e.g. sodium sulfate by scrubbing with deionized water.

In the stripping circuit, the scrubbed Mo-loaded organic solution flows to the bottom of the columnar stripping column 18, where it is contacted with stripping solution. The stripping solution can consist of dilute ammonium molybdate, fortified with gaseous ammonia. The loaded organic is stripped of its molybdenum content as it rises through the column. The stripped organic solution and ammonium molybdate product then travels to the mixer-settler 20 where the product separates from the organic. Stripped organic then flows to a wash stage 22 where it is scrubbed free of entrained ammonium molybdate. The wash solution, (dilute ammonium molybdate) can be recycled for dilution of the ammonium molybdate solution to be used as stripping solution. After scrubbing, the stripped organic flows to the last stage 24 where it is reconstituted or regenerated for recycling to the third extraction stage 14. Regeneration consists of contacting with acid solution, as for example, 150 grams $H_2SO_4$/liter of $H_2O$ to form the bisulfate or sulfate form of the amine component of the organic mixture.

The aqueous ammonium molybdate product of this process can typically have a concentration of about 200 g. Mo/liter and the raffinate can have less than about .003 g. Mo/liter. Extraction and stripping operations can be carried out at temperatures ranging from 20–60° C. but preferably at 35–45° C. for optimum phase separation and settling characteristics.

Advantages of the method and process of invention are apparent in (a) capability to utilize technical-grade starting molybdenum oxide, (b) purity of the ammonium paramolybdate or oxide product, (c) economical and efficient recovery of molybdenum by virtue of continuous operation, (d) capability to feed sodium molybdate solution of high concentration, such as about 140 g. Mo/liter, and (e) capability to produce ammonium molybdate solution of high concentration of about 200 g. Mo/liter.

A typical elemental analysis of a sample of a product obtained from the foregoing process when the ammonium molybdate solution is evaporated to dryness, is as follows.

| Element: | Parts per million (by weight) |
|---|---|
| Silicon | 34 |
| Manganese | <2 |
| Magnesium | 1.4 |
| Lead | <5 |
| Tin | <6 |
| Chromium | <6 |
| Nickel | <7 |
| Iron | <8 |
| Copper | <4 |
| Aluminum | <10 |
| Calcium | 10 |
| Sodium | 40 |
| Potassium | <10 |

EXAMPLE II

In this example all parts, proportions and percentages are by weight unless otherwise indicated.

A sodium molybdate solution is made by slurrying about 840 parts of technical-grade $MoO_3$ in 2500 parts of deionized water and adding sodium hydroxide pellets to adjust the pH to about 7.5. About 450 parts of NaOH is required. The temperature rises to about 85° C. during addition over a period of about one hour. A fluffy brown slurry containing granular sand-like material tends to settle during this stage. The solution is filtered and the residue is washed with about 100 parts of deionized water. The sodium molybdate solution contains about 289 g. $MoO_3$/l. and has sp. gr.=1.325. The dried residue weight is about 180 parts containing 18.3% of $MoO_3$. Assuming about 85% $MoO_3$ content of technical-grade $MoO_3$, the molybdenum loss in the residue is about 4.5%.

A sodium molybdate solution feed for extraction is prepared by diluting the filtrate obtained sp. gr.=1.325, 289 g. $MoO_3$/l.) with 50% by volume deionized water and adjusting the pH to 2.0 with sulfuric acid. $MoO_3$ concentration is about 145.5 g./l.

An organic extractant solution consisting of a mixture of about 10% by volume Alamine 336, about 12% by volume TBP and about 78% by volume kerosene is prepared. The solution is treated with 2 N $H_2SO_4$ using 5% of the organic volume in order to convert the amine to the amine-sulfate form. The aqueous acid layer is separated before the organic solution is used.

About one part by volume sodium molybdate solution (containing about 145.5 g. $MoO_3$/l.) is contacted with about six parts by volume of organic extractant solution. The materials are agitated for about one-half to one hour, and the phases are separated. The Mo-depleted aqueous bottom phase is removed from the settler by decantation. A reliable spot check of the aqueous solution for Mo content can be made with a 15% by weight aqueous solution of 8-hydroxy quinoline. Satisfactory extraction is indicated if no precipitate forms on addition of the reagent to aqueous solution. The Mo-loaded organic is washed two times with deionized water using about 10–20% by volume of the organic mixture. The phases are separated and the aqueous phase is removed by running it out of the bottom of the tank.

The loaded organic remaining in the tank is stripped by a 28% by weight ammonium hydroxide solution in the ratio one part $NH_4OH$ solution to ten parts of organic (parts by volume). The aqueous ammonium molybdate layer is removed from the tank after about ½–1 hour of agitation and settling.

The stripped organic solution is washed with about a 2½% by volume of deionized water. The aqueous layer is dilute ammonium molybdate solution and can be added to the ammonium molybdate product obtained by stripping.

The ammonium molybdate solution above is evaporated to a sp. gr. of 1.380 and pH=6.7 at 25° C. to crystallize ammonium paramolybdate. Spectrographic quantitative analytical data on the product prepared by ammonium molybdate derived by the batch extraction are shown following.

| Element: | Parts per million |
|---|---|
| Silicon | 15 |
| Manganese | <2 |
| Magnesium | <0.2 |
| Lead | <5 |
| Tin | <6 |
| Chromium | <6 |
| Nickel | <4 |
| Iron | <9 |
| Aluminum | <10 |
| Calcium | <2 |
| Sodium | 38 |
| Potassium | <10 |

While there has been shown and described what is at present considered the preferred embodiments of the present invention, it will be obvious to those skilled in the art that various changes and modifications may be made therein without departing from the scope of the invention as defined by the appended claims.

We claim:
1. A process for purifying an impure molybdenum source comprising:
   (a) dissolving an impure molybdenum source in an aqueous solution of an alkali metal hydroxide to attain a molybdenum-pregnant solution having a pH of above about 7.6;
   (b) lowering the pH of said aqueous molybdenum-pregnant solution to about 1 to about 4;
   (c) contacting said aqueous solution with a three component organic extractant solution consisting essentially of a trialkyl amine, an alkyl phosphate ester and a water-insoluble hydrocarbon solvent, the volumetric ratio of said trialkyl amine to said solvent is from about 1:1 to about 1:8, the volumetric ratio of said alkyl phosphate ester to said solvent is from about 1:1 to about 1:7 and the volumetric ratio of said alkyl phosphate ester to said amine being from about 1:5 to about 1:1 to extract at least some molybdenum into said organic extractant solution;
   (d) separating the resultant molybdenum-laden organic solution from the resultant molybdenum-barren raffinate;
   (e) contacting said molybdenum-laden organic solution with an aqueous stripping solution containing a source of ammonium ions to form an aqueous ammonium molybdate solution; and
   (f) separating said aqueous ammonium molybdate solution from said organic solution.

2. A process according to claim 1 wherein said amine is tricapryl amine, said trialkyl phosphate is tributyl phosphate.

3. A process according to claim 2 wherein said hydrocarbon is kerosene and the volumetric ratio of said amine to said phosphate to kerosene is about 10:12:78 respectively.

4. A process according to claim 3 wherein said stripping solution is ammonium hydroxide.

5. A process according to claim 4 wherein the volumetric ratio of said organic extractant solution to said aqueous molybdenum-pregnant solution is from about 4:1 to about 8:1.

6. A process according to claim 5 wherein the volumetric ratio of said molybdenum-pregnant organic solution to said stripping solution is from about 1:4 to about 4:1.

7. A process according to claim 6 wherein said process is a continuous process.

8. A process according to claim 7 wherein after said organic solution is contacted with said stripping solution, said organic solution is contacted with a dilute sulfuric acid solution and is thereafter recycled.

9. A process according to claim 6 wherein said process is a batch process.

References Cited

UNITED STATES PATENTS

| | | | |
|---|---|---|---|
| 3,256,057 | 6/1966 | Burwell | 23—19X |
| 3,256,058 | 6/1966 | Burwell | 23—19X |
| 3,357,821 | 12/1967 | Henrickson | 23—(312ME) |
| 3,455,677 | 7/1969 | Litz | 23—24X |
| 3,458,277 | 7/1969 | Platzke et al. | 23—22 |

HERBERT T. CARTER, Primary Examiner

U.S. Cl. X.R.

23—23, 24, 51, 312